(12) United States Patent
LittleSun et al.

(10) Patent No.: US 11,615,650 B2
(45) Date of Patent: Mar. 28, 2023

(54) TOLLING SYSTEM USING BOTH FULLY AND LIMITED EQUIPPED DETECTION SYSTEMS

(71) Applicant: Electronic Transaction Consultants, LLC, Richardson, TX (US)

(72) Inventors: Joshua LittleSun, Plano, TX (US); Alessandro Stagni, Plano, TX (US)

(73) Assignee: ELECTRONIC TRANSACTION CONSULTANTS, LLC, Richardson, TX (US)

(*) Notice: Subject to any disclaimer, the term of this patent is extended or adjusted under 35 U.S.C. 154(b) by 0 days.

(21) Appl. No.: 17/173,033

(22) Filed: Feb. 10, 2021

(65) Prior Publication Data

US 2021/0264688 A1  Aug. 26, 2021

Related U.S. Application Data

(60) Provisional application No. 62/975,537, filed on Feb. 12, 2020.

(51) Int. Cl.
| | | |
|---|---|---|
| *G06V 20/00* | (2022.01) | |
| *G07B 15/06* | (2011.01) | |
| *G06K 19/07* | (2006.01) | |
| *G06K 7/10* | (2006.01) | |
| *G06V 20/62* | (2022.01) | |

(52) U.S. Cl.
CPC ....... *G07B 15/063* (2013.01); *G06K 7/10297* (2013.01); *G06K 19/0723* (2013.01); *G06V 20/00* (2022.01); *G06V 20/625* (2022.01); *G06V 2201/08* (2022.01)

(58) Field of Classification Search
CPC .................................................. G07B 15/063
See application file for complete search history.

(56) References Cited

U.S. PATENT DOCUMENTS

| | | | |
|---|---|---|---|
| 5,857,152 A | 1/1999 | Everett | |
| 6,140,941 A | 10/2000 | Dwyer et al. | |
| 8,799,036 B1* | 8/2014 | Christensen | ....... G06Q 10/0635 |
| | | | 705/4 |
| 9,599,703 B2 | 3/2017 | Vinski et al. | |
| 2010/0237998 A1* | 9/2010 | Kohli | ................... G07B 15/063 |
| | | | 340/10.1 |
| 2015/0054675 A1* | 2/2015 | Vinski | ..................... G01S 13/74 |
| | | | 342/43 |

(Continued)

*Primary Examiner* — Mohamed Barakat
*Assistant Examiner* — Pameshanand Mahase
(74) *Attorney, Agent, or Firm* — Haynes and Boone, LLP

(57) ABSTRACT

A method performed by a computing system includes receiving from a first detection system, a plurality of identity tokens, the plurality of identity tokens including different types of identity tokens, the first detection system having a plurality of different types of detection instruments. The method further includes using information from the first detection system, creating correlation information that correlates different types of identity tokens. The method further includes receiving from a second detection system, a number of identity tokens, the second detection system having a plurality of different types of detection instruments that is fewer than the first detection system. The method further includes using the number of identity tokens received from the first and second detection systems, identifying a vehicle passing through the second detection system.

20 Claims, 11 Drawing Sheets

(56) References Cited

U.S. PATENT DOCUMENTS

| | | | |
|---|---|---|---|
| 2015/0228125 A1* | 8/2015 | Silva | G01C 21/362 |
| | | | 705/13 |
| 2017/0330454 A1* | 11/2017 | Backvall | G06K 9/00771 |
| 2018/0350158 A1 | 12/2018 | Ieuji et al. | |
| 2019/0065860 A1 | 2/2019 | Siegl | |
| 2019/0114500 A1* | 4/2019 | Hedley | G06Q 30/0283 |
| 2020/0134931 A1* | 4/2020 | Gillies | G06K 9/00771 |
| 2020/0204883 A1 | 6/2020 | Gang et al. | |

\* cited by examiner

TOLLING SYSTEM USING BOTH FULLY AND LIMITED EQUIPPED DETECTION SYSTEMS

PRIORITY INFORMATION

This application claims the benefit of U.S. Provisional Patent No. 62/975,537 filed Feb. 12, 2020 and entitled "Tolling System Using Both Fully and Limited Equipped Lanes," the disclosure of which is hereby incorporated by reference in the entirety.

BACKGROUND

Conventional methods for collecting tolls on tollways typically involve issuing Radio Frequency Identification (RFID) Tags (a.k.a. toll tags) to users. The users then place these toll tags in their vehicles. When the vehicles pass through a toll tunnel, a toll tag reader within the tunnel detects the toll tag. The account associated with that toll tag can then be billed accordingly.

While this approach works for highway systems, it is not generally conducive to dense urban areas where constructing toll tunnels is not feasible. Moreover, toll tunnels and the equipment associated therewith may be expensive and not always reliable. Thus, there is a desire to improve the way tolls are collected by increasing reliability without relying extensively on high-priced equipment.

BRIEF DESCRIPTION OF THE DRAWINGS

The present disclosure is best understood from the following detailed description when read with the accompanying figures.

DESCRIPTION

Figure 1:
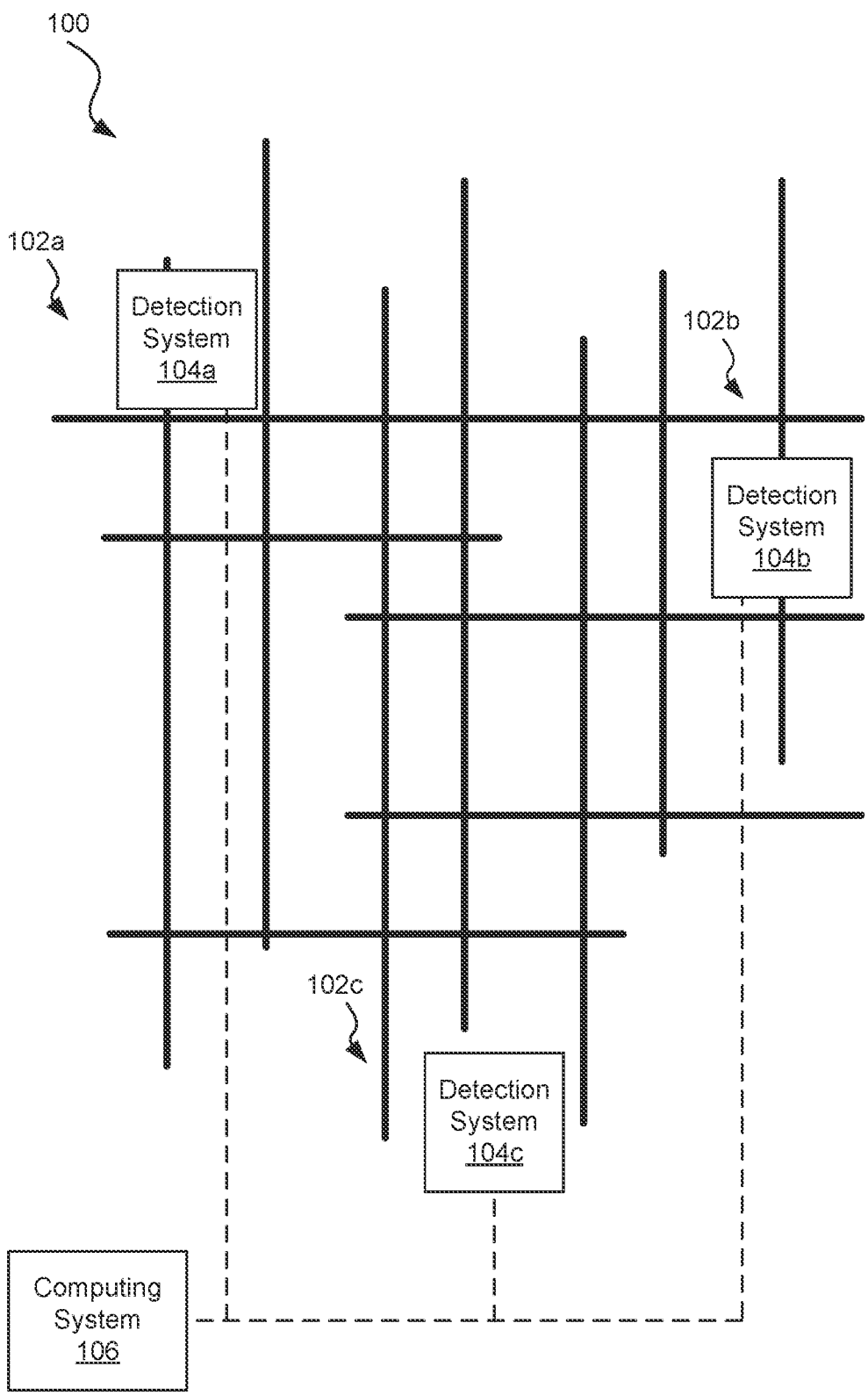
FIG. 1 is a diagram showing an illustrative environment in which detection systems for tolling may be used, according to one example of principles described herein.

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Currently in the tolling industry, vehicle detection occurs at a defined point on the roadway. And, the detection of a vehicle identity has to be precisely timed in order to associate the right identity (e.g., license plate number) with the right vehicle. This is done by synchronizing detection events by means of triggers. For example, the vehicle is detected at a precise point in a lane using a magnetic loop under the pavement or other expensive technologies (radar, laser, LIDAR, etc.). The positioning of detection systems (RFID transponder, cameras, etc.) must be done in a precise way (typically overhead) to be able to exclude other vehicles from being associated with that transit. This approach requires installations that are expensive and limited to specific requirements and tolerances for infrastructure design. This approach is very difficult or impossible in urban areas where traffic is not aligned in lanes and where each detection point can impose strong physical design restrictions.

To address this and other issues, the principles described herein are directed to methods and systems for using a combination of both fully equipped lanes and lesser equipped or limited equipped lanes. A fully equipped lane may include a variety of detection instruments such as cameras, RFID systems, Bluetooth systems, etc. The detection instruments of the fully equipped lane may be set up so that they identify a single vehicle passing through a specific point at a given time. A limited equipped lane may have fewer detection systems or be set up in a way such that the detection systems cover a wider physical space such that detection is not associated with a single event at a specific location.

As a vehicle passes through a fully equipped lane, the sensors of that fully equipped lane are able to pick up multiple identity tokens (e.g., RFID tag, license plate, Bluetooth MAC address, etc.). As that vehicle passes through a lesser equipped lane, it may pick up only a Bluetooth MAC address or only a front license plate. However, that vehicle may be still be identified due to correlation information that is built as the vehicle moves through multiple detection points.

The correlation information associates different identity tokens with a particular vehicle. For example, correlation information associates an RFID tag with a license plate. This correlation may be built up as a vehicle passes through fully equipped lanes. This correlation information may then be used to identify a vehicle passing through a limited equipped lane. For example, a vehicle's Bluetooth MAC address may be detected as it passes through a limited equipped lane. Because the correlation information allows that Bluetooth MAC address to be associated with other identifiers such as license plate and RFID tag, an account associated with that vehicle may thus be charged.

Building the correlation information may involve correlating identity tokens detected by a plurality of vehicles. A vehicle may have various identity tokens that uniquely identify that vehicle. Such identity tokens may include, but are not limited to, a license plate number, an RFID tag, a cellular network identifier, or a network address (e.g., a Media Access Control (MAC) address for a Bluetooth transponder). A detection system with different detection instruments may be used to capture the identity tokens of vehicles passing through a detection volume (i.e., a defined region through which vehicles pass). For example, an image capture device may capture license plate numbers of vehicles passing through the detection volume. An RFID transponder may detect the RFID tags in such vehicles. A Bluetooth transponder may detect the MAC addresses of the Bluetooth systems in such vehicles. The various detection instruments of a detection system may report the identity tokens they detect to a processing system. That processing system, however, may not automatically know which identity token is correlated with an identity token of a different type. In other words, the system does not automatically know which license plate number goes with which RFID tag or which Bluetooth MAC address. This is because there may be large numbers of vehicles passing through the detection volume at a particular time.

According to principles described herein, methods and systems for using the data collected may be employed to correlate identity tokens of different types with each other. In one example, a processing system keeps track of the number of occurrences an identity token is detected as well as the number of co-occurrences of other identity tokens with that identity token. If certain predefined criteria are met (i.e., the ratio of occurrences to co-occurrences exceeding a threshold), then two identity tokens can be deemed as belonging to the same vehicle. For example, if it is determined that when a particular license plate number is detected, it is almost always accompanied by a particular Bluetooth MAC address, then it can be determined that that MAC address belongs to the same vehicle as that license plate number.

Correlating identity tokens in this manner allows for specific improvements to tolling technology and infrastructure. Specifically, detection points may be set up in dense urban areas rather than at a gantry on a highway. An urban setting has smaller lanes, fewer lanes, and slower speeds than a highway. Urban settings also have multiple intersections with traffic control mechanisms like stop signs and stop lights.

Additionally, some detection points may be set up with fewer types of detection systems. For example, there may be some detection points where only a Bluetooth transponder is established. Because of the correlation process described above, the tolling systems may know to associate a particular Bluetooth MAC address with a particular license plate, which may be linked to a customer account. Thus, even though only the MAC address is detected, a customer can still be billed. Furthermore, even if more types of detection systems are set up at a particular detection points the requirements for such detection systems may be relaxed. Specifically, more cost-effective pieces of equipment may be used because even if such pieces of equipment do not accurately identity a particular identity token every time, the detection of other identity tokens which have previously been correlated to a vehicle may compensate for the times in which a particular detection system does not accurately detect a particular identity token. Furthermore, tolling systems may be installed without the use of expensive equipment to trigger and synchronize the passing of vehicles with the instance of detection. And, strict lane keeping requirements may be relaxed.

FIG. 1 is a diagram showing an illustrative environment in which detection systems for tolling may be used. According to the present example, an environment includes a plurality of detection systems 104a, 104b, 104c. Each of the detection systems 104a, 104b, 104c may be in communication with a computing system 106. Each of the detection systems 104a, 104b, 104c may be located at a different detection point (e.g., geographical location).

Each of the detection points 102a, 102b, 102c may be associated with a specific geographical region 100 in which tolling is implemented. For example, the geographic region 100 may be a city or a part of a city. The geographic region 100 may span multiple cities, states, or other geographical definitions.

Each of the detections systems 104a, 104b, 104c may correspond to a different detection point 102a, 102b, 102c. Specifically, detection system 104a is placed at geographic location 102a, detection system 104b is placed at detection point 102b, detection system 104c is placed at detection point 102c. Each of the detection systems 104a, 104b, 104c may include a set of detection instruments for detecting different types of identity tokens. And, each of the detection systems 104a, 104b, 104c is designed to cover a detection volume. More detail on the detection instruments and detection volumes will be discussed below in the text accompanying FIGS. 2A and 2B.

The computing system 106 may be one or more computing devices such as servers that include both processing and storage capabilities. The computing system 106 receives data from each of the detection systems 104a, 104b, 104c and records the number of times particular identity tokens are detected by the detection systems.

Figure 2A:
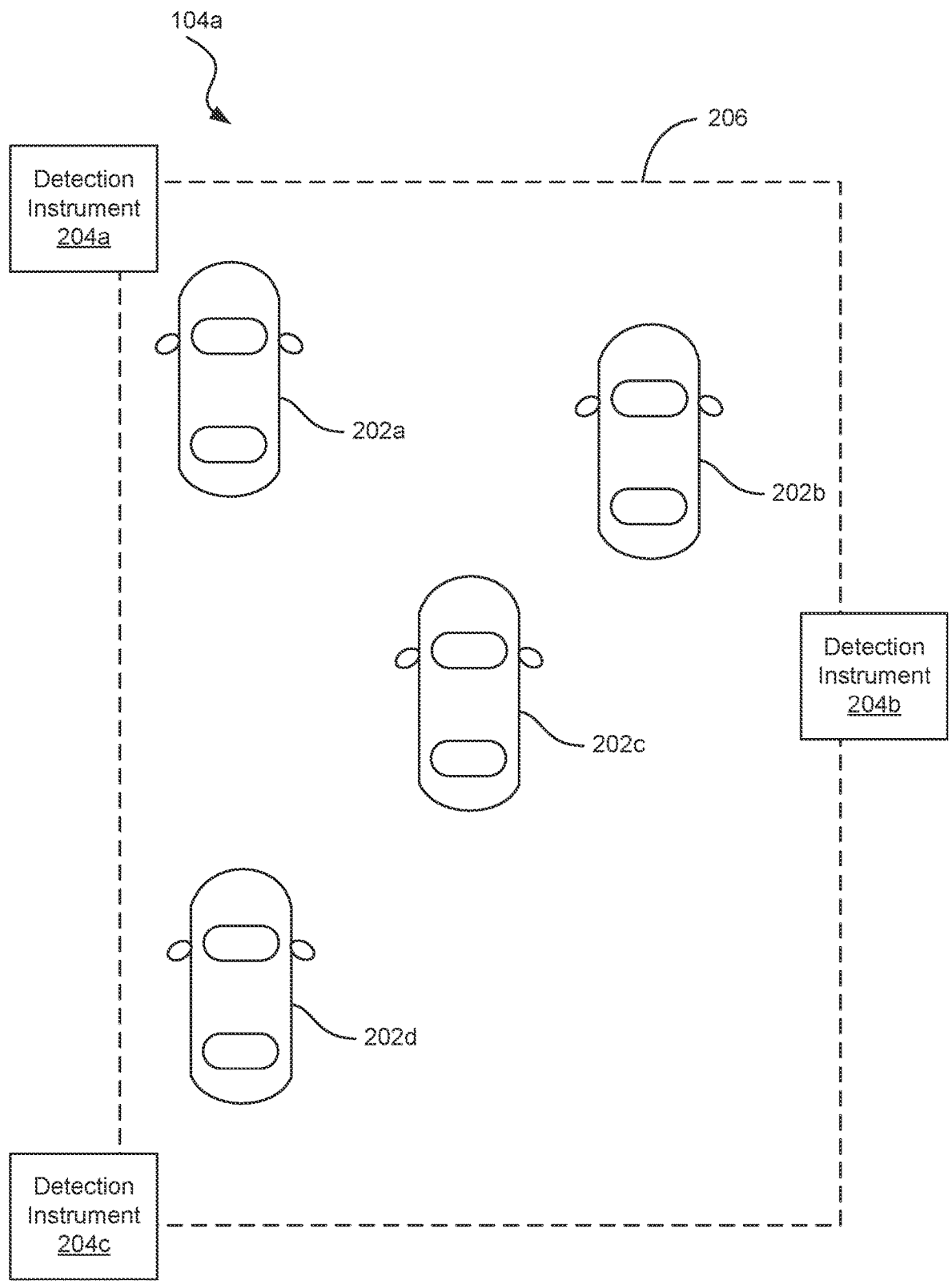
FIGS. 2A, 2B, 2C, and 2D are diagrams showing an illustrative detection system for detecting moving objects within a detection volume, according to principles described herein.
Figure 2B:
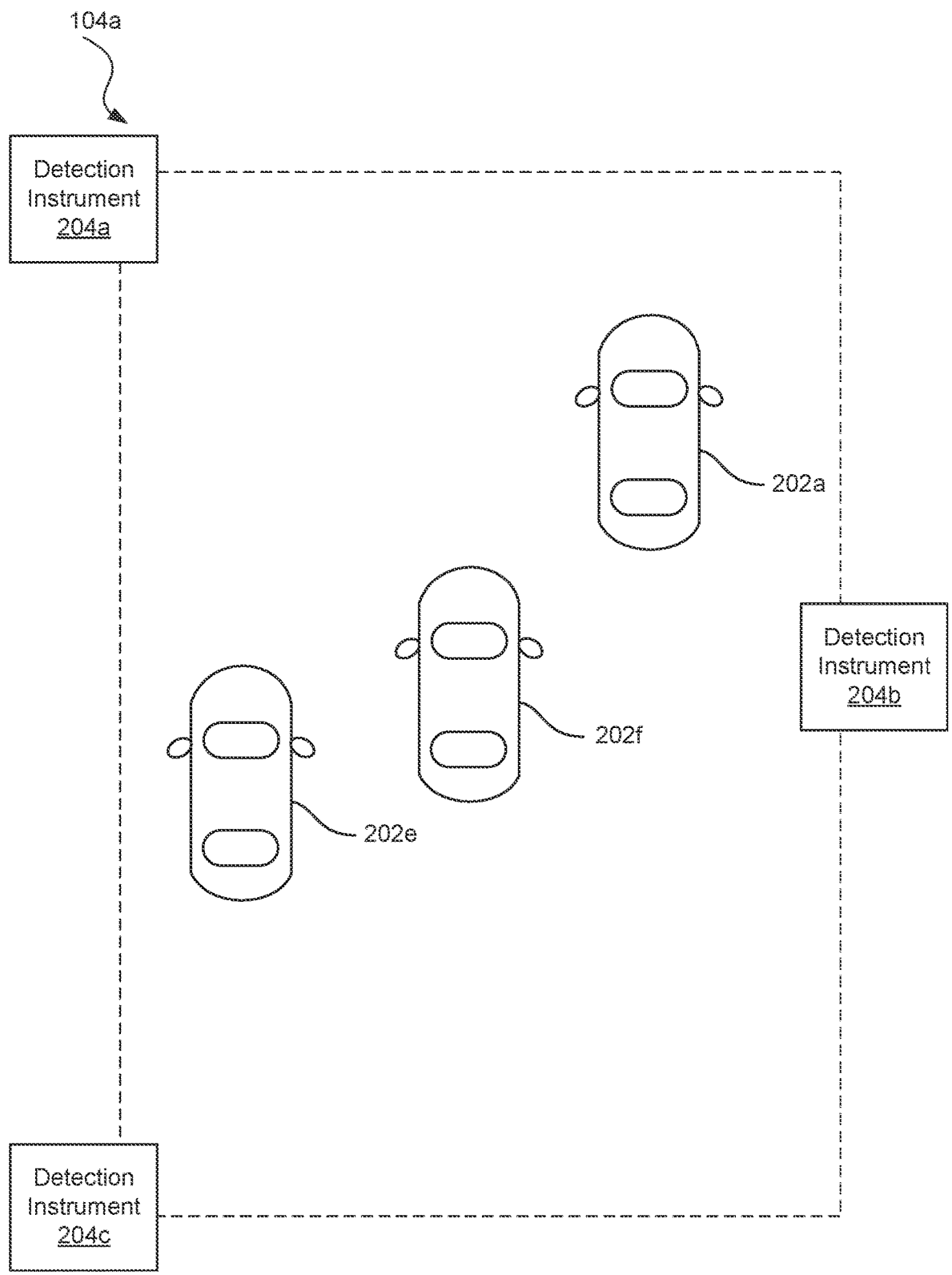

FIGS. 2A and 2B are diagrams showing an illustrative detection system 104 for detecting moving objects within a detection volume 206. To detect the moving objects, the detection system 104 includes a plurality of detection instruments 204a, 204b, 204c. In the present example, the moving objects are vehicles 202a, 202b, 202c, 202d.

Each of the detection instruments 204a, 204b, 204c may be configured to detect a specific type of identity token. For example, detection instrument 204a may be an image sensor that captures video or still images of vehicles passing through the detection volume 206. The detection instrument 204a may also include the functionality to analyze the data and identify license plates on the vehicles passing through. For example, the detection instrument 206 may apply an Optical Character Recognition (OCR) function to the video or still images and identify license plate numbers as well as the issuing entity (e.g., state).

In a further example, detection instrument 204b may be an RFID transponder. An RFID transponder emits a signal that is received by the RFID tags in the passing vehicles. In response to detecting the RFID signal from the transponder, the RFID tags in the vehicle will transmit a unique identifier back to the RFID transponder. That unique identifier may be used as an identity token to uniquely identify a particular vehicle.

In a further example, detection instrument 204c may be a network transponder that is configured to detect a network address of a vehicle. Vehicles may include network systems such as Bluetooth connectors to allow passengers to connect devices such as phones to the vehicle. Such vehicles announce a network address such as a MAC address. The detection instrument 204c may be able to detect this network address. In some examples, the detection instrument also detects the network address of devices such as cell-phones or tablets within a vehicle. The network transponder may also be for other types of networks, including cellular networks.

The detection system 104 may be configured to detect vehicles within specified time frames, which will be referred to as detection windows or detection time windows. For example, in a particular detection window, the detection system 104 may detect various identity tokens from four different vehicles 202a, 202b, 202c, 202d. The detection time window may be a predefined time range and may have a default size of 1 to 40 seconds, for example. Other detection time window sizes are contemplated. In some cases, the time window may be based on the size of the detection volume. If, for example, the detection volume covers a large section of a street and/or there are larger distances between the detection instruments 204a, 204b, 204c, then a larger detection window may be used. Conversely, if the detection volume 206 covers a smaller section of a street and/or there are smaller distances between the detection instruments 204a, 204b, 204c, then a smaller detection window may be used.

In some examples, the detection window may be dynamically adjusted based on external factors such as traffic. For example, when traffic is moving slower (as detected by RADAR or LIDAR sensors associated with the detection system 104), a larger detection window may be appropriate because it may take the vehicles a longer amount of time to pass through the detection volume. This way, the greater time window allows for an object passing through to be detected by each of the detection instruments distributed throughout the detection volume. Conversely, when traffic is moving faster, a smaller detection window may be appropriate because the vehicles may take less time to pass through the detection volume. Thus, the detection window may be adjusted in real-time based on detected changes in traffic patterns.

A detection window may have a default value of, for example, 20 seconds. However, as mentioned above, it may be dynamically adjusted and thus may range from 1 seconds to 40 seconds. The detection window may be based on the physical structure of its associated detection point. For example, the detection window may be an estimation of the time that a moving object can trigger each of the detection instruments of a particular detection system. The detection window may also depend on the types of detection instruments that are collected by a particular detection system.

In some examples, the detection windows may be non-overlapping. For example, every 30 seconds a current detection time window stops, and a new detection time window begins. In some examples, however, detection time windows may be at least partially overlapping. In some examples, time windows may be defined with respect to the time at which a particular identity token is detected. For example, a detection time window for a particular identity token may be defined to be plus or minus 15 seconds from when that particular identity token was detected. Any other identity tokens detected within that plus or minus 15 second time window will be deemed a co-occurrence.

As the vehicles 202a, 202b, 202c, 202d pass through the detection volume 206 for a given detection window, the system records the occurrences for each of the identity tokens associated with each of the vehicles 202a, 202b, 202c, 202d. For example, the detection systems may detect 4 license plate numbers, 3 RFID tag identifiers, and 2 Bluetooth MAC addresses. It may be the case that some vehicles either don't have Bluetooth MAC addresses or for whatever reason the detection system did not properly detect the Bluetooth MAC address for a particular vehicle. It may also be the case that not all vehicles have an RFID tag. While the system detects a total of 4 license plate numbers, 3 RFID tag identifiers, and 2 Bluetooth MAC addresses, this data alone is not sufficient to determine which MAC address is correlated with which license plate number or which RFID tag identifier. However, by collecting more data and applying the correlation functions described herein, such correlations can be made.

FIG. 2B illustrates the detection volume 206 at a different detection window. The different detection window may be, for example, on a different day around a similar time. In this new detection window, the detection instruments 204a, 204b, 204c may detect identity tokens from vehicles 202a, 202e, and 202f. Thus, if the same pair of license plate number and MAC address are detected as the detection window of FIG. 2A, then it may be more likely that those two are correlated as there has been more than one co-occurrence of that pair. However, the system may have higher thresholds of detecting the co-occurrence of two identity tokens before officially deeming two identity tokens as being correlated. Thus, the system will continue to collect data. As vehicle 202a passes through more detection points at different geographic locations and at different time windows, the computing system 106 may determine with sufficient probability that two different identity tokens are correlated with the same vehicle.

The computing system may thus record the occurrences and co-occurrences of identity tokens for vehicles as they pass through various detection volumes within various detection windows. The collected data may be stored in a variety of formats or data structures. One such data structure is a graph.

Figure 2C:
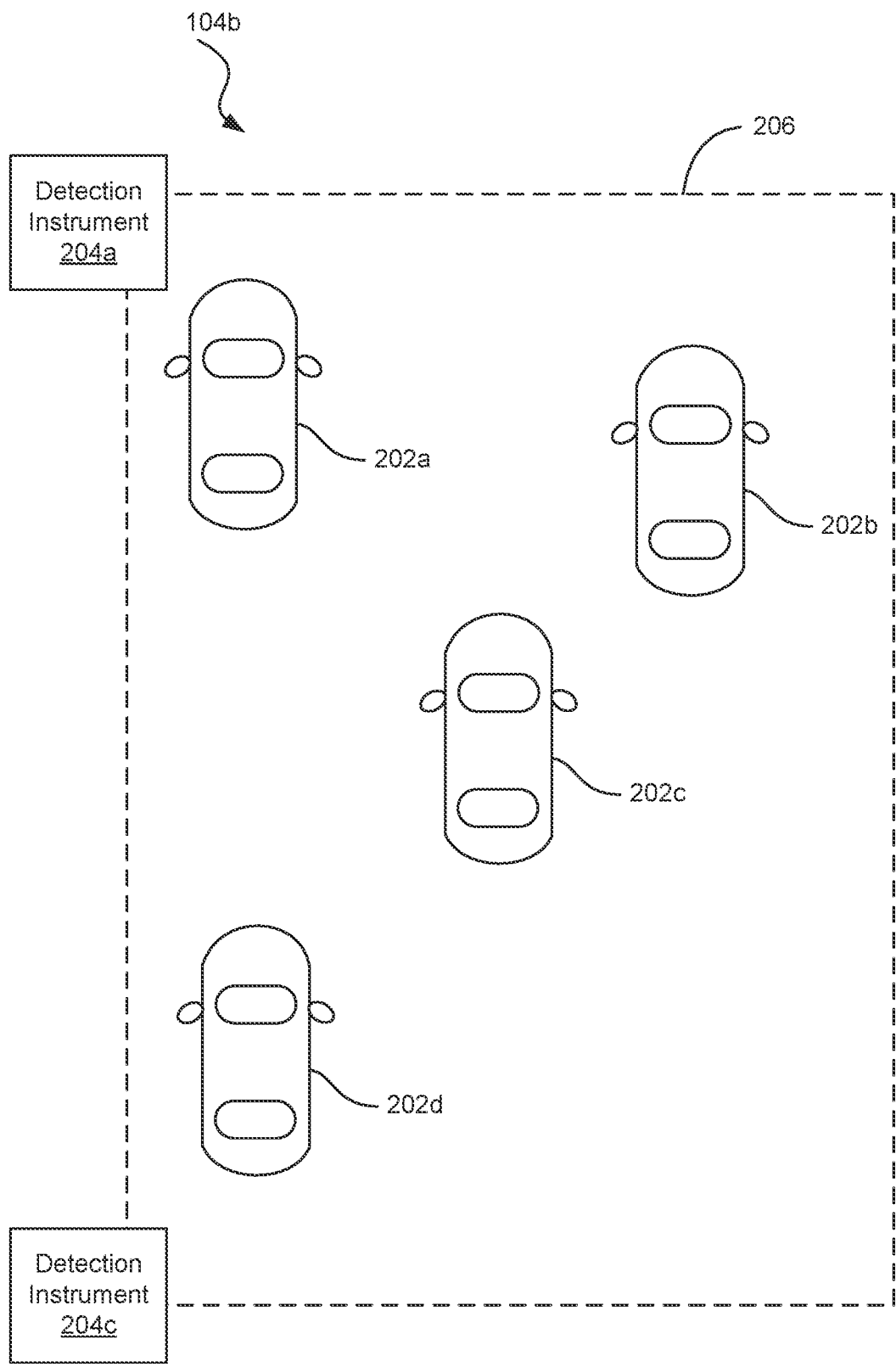

FIG. 2C illustrates a detection system 104b at a different location within the geographic region 100. In the present example, detection system 104b differs from detection system 104a in that it has fewer detection instruments. In the present example, detection system 104b includes detection system 204a and detection system 204c. Continuing the examples from above, detection instrument 204a may be an image capture device that is capable of taking images of license plate numbers and reading the license plate from those images. Detection instrument 204c may be, for example, a Bluetooth reader that is able to detect the network address of a Bluetooth system in passing vehicles.

The detection system 104b may be placed in parts of the geographic region where placement of additional instruments (such as an RFID transponder) are impractical. An RFID transponder often requires a large gantry with expensive equipment. While such a setup may be practical for large open highways, it may not be practical in smaller urban streets. However, using the techniques described below, the detection system 104b may still be able to accurately identify passing vehicles at such locations even with fewer detection instruments.

Figure 2D:
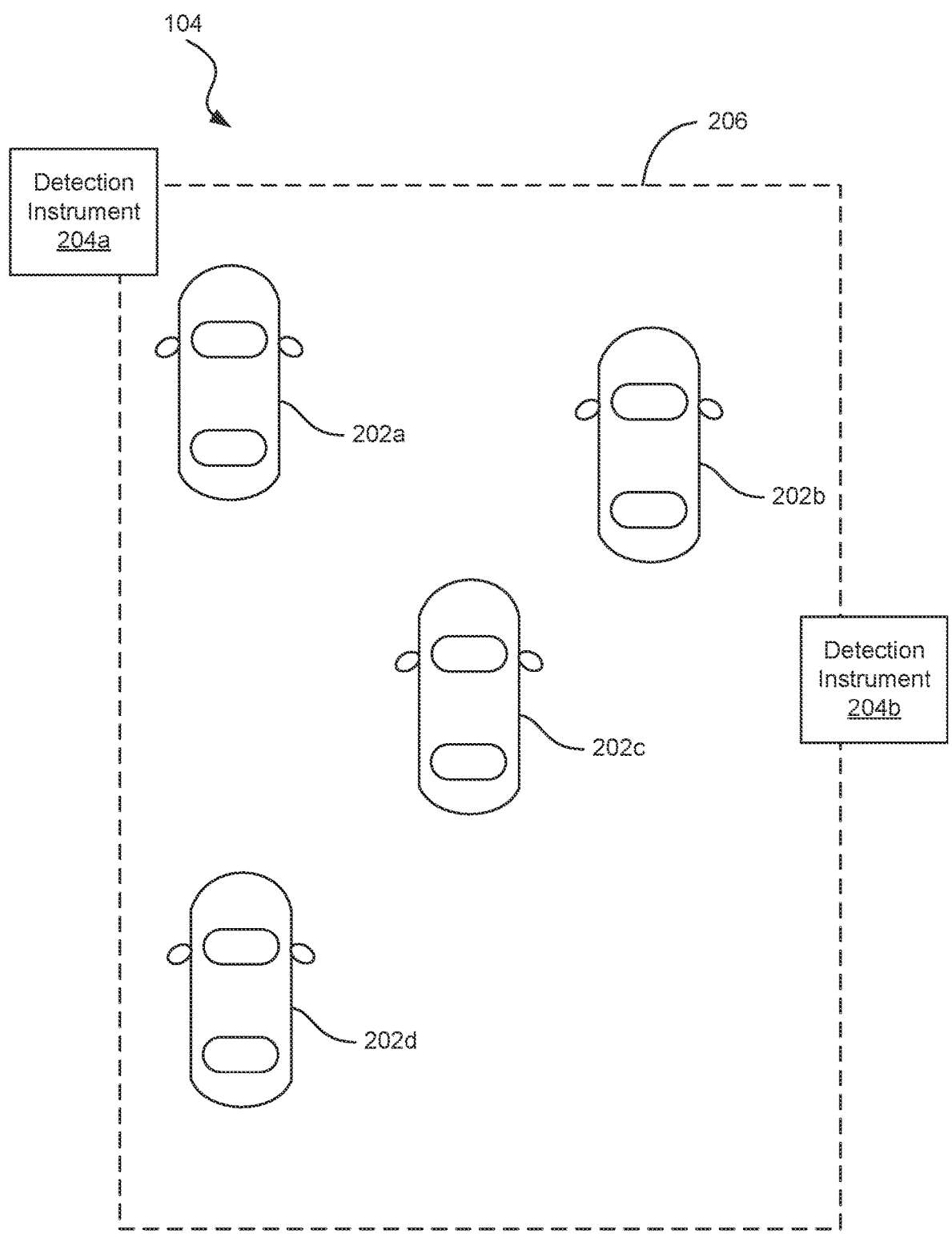

FIG. 2D illustrates a similar situation in which detection system 104c includes fewer detection instruments. In the present example, the detection system 104c includes detection instrument 204a and detection instrument 204b. In some examples, the reason for having fewer detection instruments in a particular detection system may be cost. Detection equipment may be expensive to set up, operate, and maintain. It is desirable to reduce such costs and still have an effective way of identifying passing vehicles at each detection system. Using the techniques described herein, some of the detection systems within a geographic region may utilize fewer detection instruments, and still maintain accurate identification using the pairing techniques described herein.

In some examples, the detection systems that have more detection instruments may be placed on a gantry over a highway. Detection systems that have fewer detection instruments may be placed in an urban setting with slower speeds and traffic control mechanisms such as stop lights and stop signs. The detection systems with fewer detection instruments may have a larger detection time window and a larger detection volume in order to better capture the moving objects moving through at slower speeds.

Figure 3A:
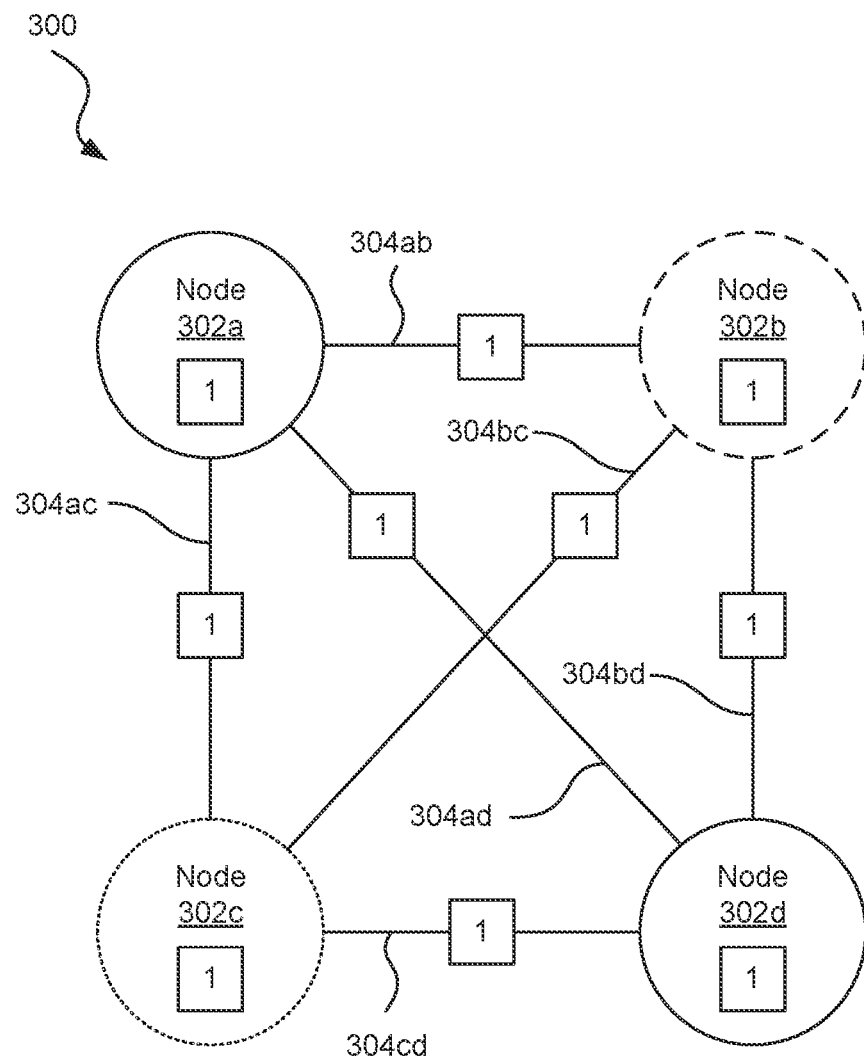
FIGS. 3A and 3B are diagrams showing an illustrative graph for use with correlating vehicle identity tokens, according to one example of principles described herein.
Figure 3B:
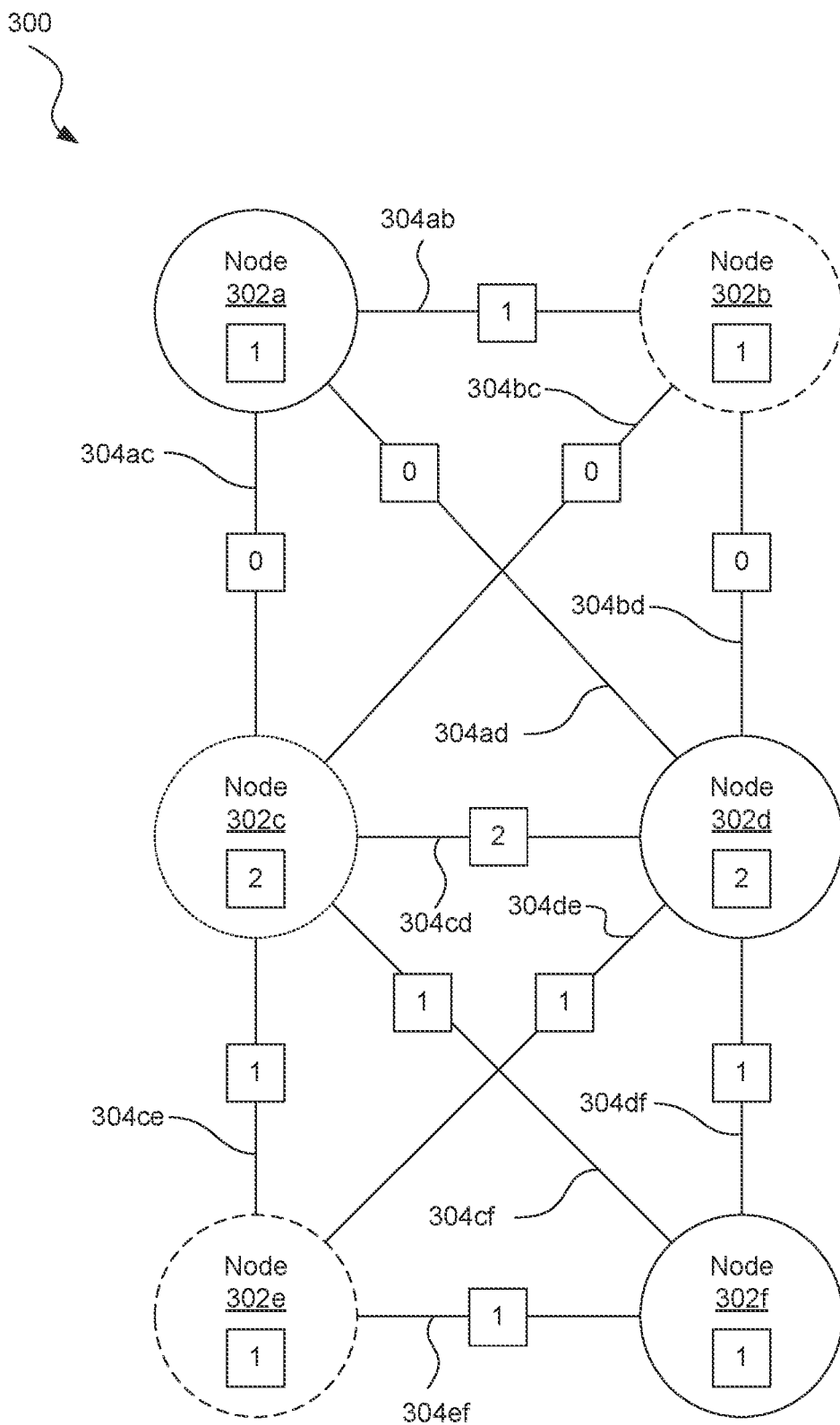

FIGS. 3A and 3B are diagrams showing an illustrative graph for use with correlating vehicle identity tokens. A graph is a data structure that includes a plurality of nodes (represented by circles) and edges (represented as lines connecting the nodes). Whenever the occurrence of an identity token is detected, a corresponding node within the graph may be incremented. Whenever the co-occurrence between two identity tokens are detected within a detection window, the edge between the two corresponding nodes may be incremented.

FIG. 3A illustrates an example of a graph after a set of identity tokens has been detected within a detection window. Specifically, the graph includes four nodes 302a, 302b, 302c, 302d. Each node is associated with a different identity token. For the sake of example, nodes 302a and 302d are associated with a license plate number, node 302b is associated with an RFID tag identifier, and node 302c is associated with a network address.

The value for each of the nodes represents the number of occurrences for their respective identity tokens. An occurrence occurs any time an identity token is detected by a detection system within a given detection window. In the present example, the value for each of the nodes is 1.

The value for each of the edges 304 between the nodes indicates the number of co-occurrences for those nodes. For example, when the license plate number associated with node 302a is detected within the same detection window and detection volume as the RFID tag identifier associated with node 302b, then the value of edge 304ab is incremented by 1. Similarly, edges 304ac, 304ad, 304bc, 304bd, 304cd are also incremented by 1.

FIG. 3B illustrates the stated of the graph after some additional identity tokens are detected within a different detection window or at a different detection volume. Specifically, four new identity tokens are detected. Two of the four identity tokens correspond to nodes 302c and 302d. Thus, the value in each of those nodes is incremented by one, as the detection of such identity tokens represents an occurrence. Additionally, the edge 304cd between nodes 302c and 302d is incremented, as the presence of those two identity tokens within the same detection window represents a co-occurrence.

The other two identity tokens detected within the new detection window are new and thus new nodes 302e and 302f are created. Furthermore, the value in the new nodes 302e, 302f are incremented to 1, as the detection of the identity tokens represents an occurrence. And, the edges 304ce, 304cf, 304de, 304df, 304ef are incremented, as the detection of the associated identity tokens within the same detection window represent a co-occurrence.

Furthermore, certain edges are decremented. Specifically, the edges between two nodes are decremented if one of the identity tokens associated with one of the two nodes is detected within a time window without detection of the identity token associated with the other of the two nodes. Thus, in the present example, because nodes 302c and 302d were detected without nodes 302a and 302b, edges 304ac, 304bc, 304ad, and 304bd are decremented. When one identity token is detected without another identity token within the same time window, it is less likely that those two nodes are associated with the same vehicle. As the system collects more data from additional time windows at various detection volumes, the graph will continue to expand and form new nodes and new edges and will start to look more like the graph 400 of FIG. 4A.

Figure 4A:
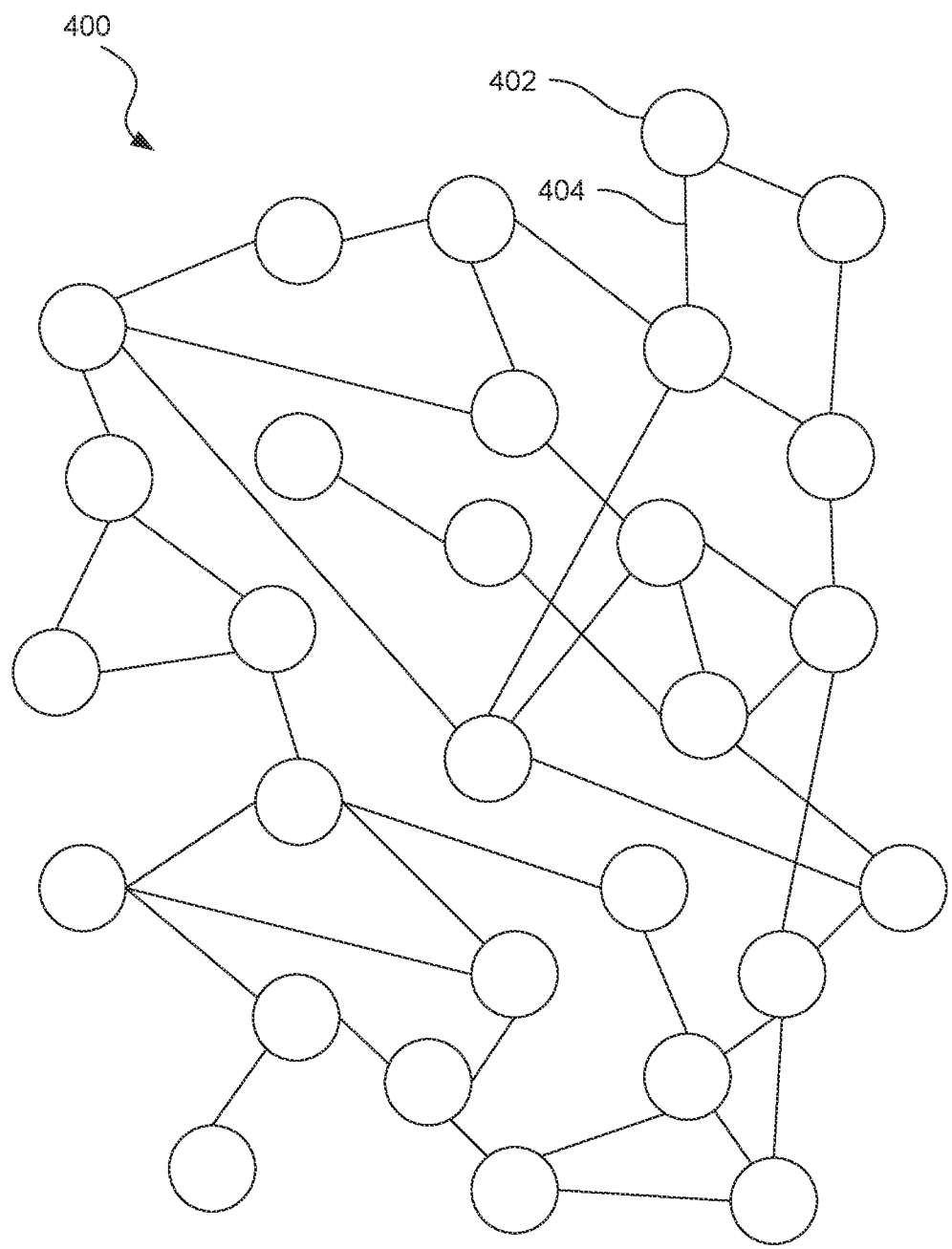
FIGS. 4A and 4B are diagrams showing graphs for use with correlating vehicle identity tokens, according to one example of principles described herein.
Figure 4B:
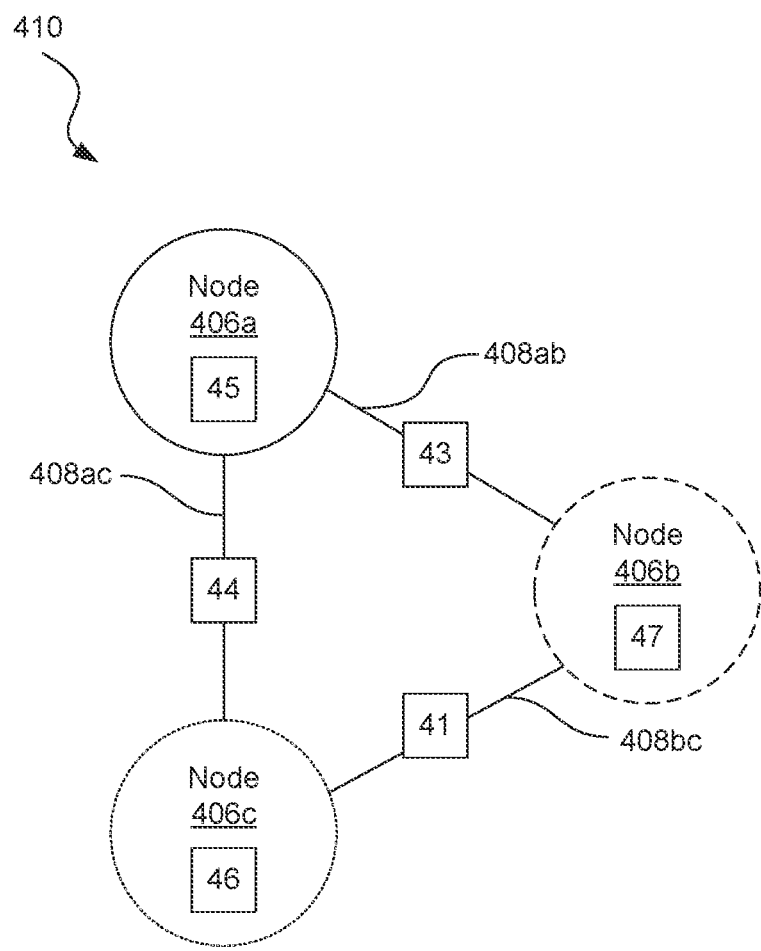

FIGS. 4A and 4B are diagrams showing graphs for use with correlating vehicle identity tokens. As the detection systems collect more data and detect more identity tokens in more detection windows, the graph 400 continues to build as new connections are made and broken. Specifically, several nodes 402 and edges 404 are created. After a period of time, however, sections of the graph will break off, as shown in FIG. 4B.

FIG. 4B illustrates a stabilized portion 410 of a graph. Specifically, after more data is collected, identity tokens associated with a particular vehicle or moving object will separate and form a stabilized portion. Specifically, node 406a corresponding to a license plate number has 45 occurrences. Node 406b corresponding to an RFID tag identifier has 47 occurrences. Node 406c corresponding to a network address has 46 occurrences.

The number of occurrences for each of the nodes 406a, 406b, 406 may be different for a variety of reasons. One of the detection instruments may not accurately detect a particular identity token. For example, due to poor weather conditions, the image sensor may not get a clear picture of a license plate. Furthermore, it may be the case that a person has moved an RFID tag to another vehicle. It may also be the case that a network system (such as a Bluetooth system) in a vehicle is not active when it passes through a detection point. The number of co-occurrences, as denoted through the values of the edges 408ab, 408ac, 408bc between the nodes 406a, 406b, 406c, may also be different for similar reasons.

Figure 5:
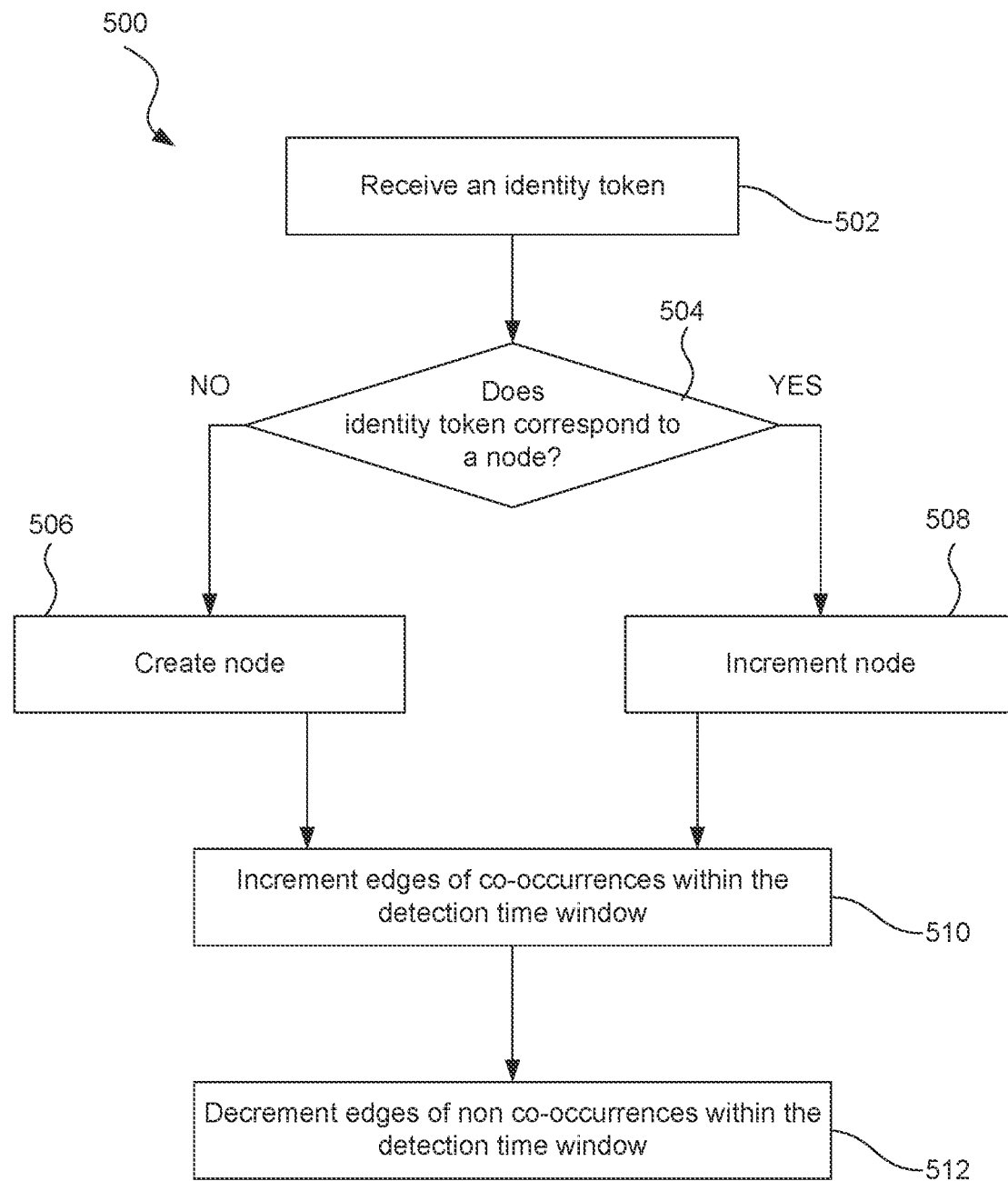
FIG. 5 is a flowchart showing an illustrative process for correlating identity tokens, according to one example of principles described herein.

FIG. 5 is a flowchart showing an illustrative process for correlating identity tokens. According to the present example, the method 500 includes a process 502 for receiving an identity token. The identity token may be, for example, a license plate number, an RFID tag identifier, a network address, or other token that uniquely identifies a vehicle. The identity token may be received by a computing system (e.g., 106) after being detected by a detection instrument of a detection system as a vehicle or other moving object passes through a detection volume within a detection window.

The method 500 further includes a process 504 for determining whether that identity token corresponds to a current node within the graph. For example, if the received identity token is a license plate number, then the computing system determines whether that specific license plate number has previously been detected and already has an associated node in the graph. If it is determined that there is no corresponding node (504, No), then the method 500 proceeds to process 506, at which point a corresponding node is created. This new node may be created with a value of 1. If there is already a corresponding node (504, Yes), then the method 500 proceeds to step 508 at which the already created node is incremented.

The method 500 further includes a process 510 for incrementing edges of co-occurrences within the detection time window. Specifically, after nodes have been created and/or incremented for each identity token within a specific time window at a specific detection volume, the edges between each of those nodes are incremented. For example, if the license plate number was detected with a number of other identity tokens in the same time window, then each of those other identity tokens will have corresponding nodes in the graph. Thus, the edges between the node associated with the license plate number and the nodes associated with the other identity tokens will be incremented.

The method 500 further includes a process 512 for decrementing edges of non-co-occurrences within the detection window. Specifically, a particular identity token may already have a node in the graph, and that node may be connected to other nodes through various edges. However, during the current time window, that particular identity token may not be co-occurrent with some of the other identity tokens. In such case, those previous co-occurrences may have been due to two separate vehicles passing though the detection volume at the same period of time rather than due to the two identity tokens being associated with the same vehicle. Thus, such edges are decremented.

In some examples the detection systems may detect other features of moving objects that do not necessarily uniquely identify a moving object. Such features may be, for example, color, length, volume, model, make, etc. Such features will be referred to as qualifiers. The qualifiers may be identified using various detection instruments. For example, the image sensor that is used to identify the license plate number may also identify qualifiers. Specifically, an image analysis function may be applied to identify make, model, and color of a vehicle. Other detection instruments such as LIDAR or RADAR instruments may be used to identify size, length, or volume characteristics of vehicles. Identified qualifiers may be associated with a particular identity token, such as license plate and then be associated with an object identity.

Qualifiers are thus detection of characteristics that are not unique. A similar approach to what has been described above may be used to build relationships between qualifiers and identity tokens. Because qualifiers are not unique, several instances of the same qualifier may appear within the same detection window at the same detection point. For example, the system may detect several white cars within a detection window.

In order to make the co-occurrences process converging to a stable association with a set of identity tokens that represents a moving object, the qualifier should have some peculiar characteristics. The range of value of the qualifier type should be wide enough to guarantee that, statistically, in a certain finite time window of correlation, the probability of always finding the same subset of qualifiers in all the detection points is reasonably low. For example, if a qualifier is the number of axles in an urban environment, the probability of detecting multiple two axle vehicles in a detection point during a detection window is very high, preventing the process to converge to a unique association between a qualifier and an identity token. Two different approaches may be used to address this.

In one example, a detection instrument may be capable of extracting more information. For example, a vehicle axle detection system may not only identify the number of axles but also identify the distance between axles, which may be a more unique characteristic. Once the number of axles and the distances is processed by a clustering function (for example k-mean) with a sufficient number of centroids, the probability that a vehicle with the same exact characteristic (the same centroid is assigned to) is always present in all the detection points is sufficiently lower than 1. This allows the process to converge to a strong association after few detections with very high probability.

In another example, a detection instrument such as an image sensor may detect both a license plate number (identity token) as well as the vehicle color (qualifier). In this case the graph co-occurrence is built as a synchronized co-occurrence. That, in some way, it is similar to a traditional triggered approach. Nevertheless, the counters and specific thresholds are still built in the same way described above. Using qualifiers in this manner can help reduce or eliminate detection errors, changes, or anomalies (e.g., a license plate moved from a white to a black vehicle).

In some examples, a "quorum" based approach is used. For example, a moving object identity may be associated with a set of qualifiers. In other words, each identity token in the graph component (an isolated subgraph of connected nodes) associated with a moving object identity will produce a weighted set of associations with a subset of qualifiers. If a certain quorum is reached (for example the 80%) of accordance among the identity token, that qualifier is connected to the vehicle identity.

In some examples, each time a co-occurrence edge is updated the system may check the ratios between occurrences and co-occurrences (and optionally other parameters such us frequency of the simultaneities, last date seen, etc.). In some examples, if one or both parameters fall under predefined thresholds (numbers between 0 and 1) the co-occurrence will be deleted. In other words, whatever value an edge has, it may be deleted if the occurrences far outweigh the co-occurrences.

As the system evolves and brings in more data, the co-occurrences graph 400 becomes more and more fragmented (loosely connected). Each group of isolated edges will stabilize and will represent, with a very high probability, the collection of identity tokens integral to a particular moving object. This aggregation will be referred to as a moving object identity. The moving object identity is a statistical property of the object. Nevertheless, if the system is properly configuring the aggregate the probability of an error in the aggregation decrease exponentially with the number of detections.

The system may also distinguish between unambiguous and ambiguous identity. Specifically, different identity token types may have pre-assigned ambiguity values. A front license plate and rear license plate may have a low level of ambiguity, because these things are less likely to be changed. An RFID tag may have a slightly higher level of ambiguity because customers may switch RFID tags between different vehicles. A fixed Bluetooth MAC address may have a higher level of ambiguity because a Bluetooth MAC address may be associated with other items in a vehicle besides the vehicle itself, such as cell phones, tablets, etc.

It also possible to define an ambiguity level based on, for example, the number of transponders associated with an object. The number of transponders can have a statistical distribution where 0 has a 40% probability, 1 transponder 55%, 2 transponder 4%, etc.). A vehicle identity with 5 transponders will have a higher level of ambiguity than a vehicle with one transponder. An identity with 2 rear license plate will have a very high level of ambiguity.

Figure 6:
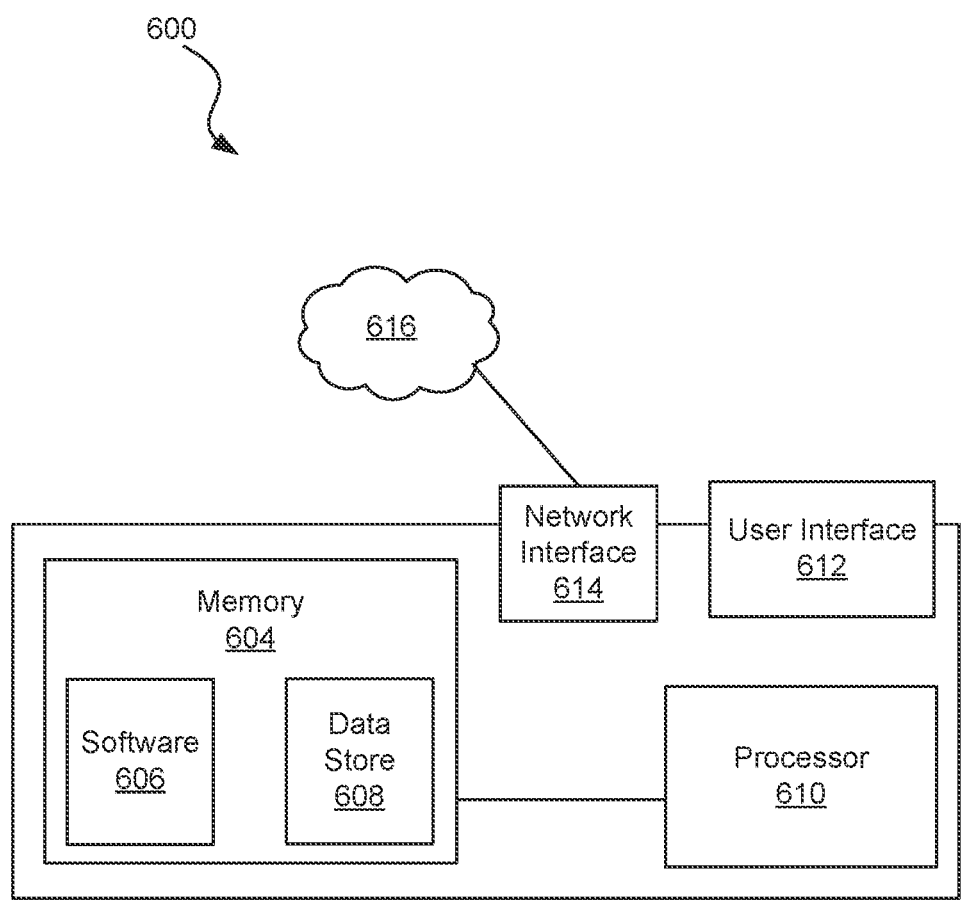
FIG. 6 is a diagram showing an illustrative computing system that may be used for correlating identity tokens, according to one example of principles described herein.

FIG. 6 is a diagram showing an illustrative computing system that may be used for correlating identity tokens. For example, the computing system 600 may be used to perform the functions associated with the computing system 106. Other functions described herein may also be performed by computing systems such as computing system 600. According to certain illustrative examples, the computing system 600 includes a memory 604 which may include software 606 and a data store 608. The processing system 600 also includes a processor 510, a network interface 614, and a user interface 612.

The memory 604 may be one of several different types of memory. Some types of memory, such as solid-state drives, are designed for storage. These types of memory typically have large storage volume but relatively slow performance. Other types of memory, such as those used for Random Access Memory (RAM), are optimized for speed and are often referred to as "working memory." The various types of memory may store information in the form of software 606 and data in the data store 608.

The computing system 600 also includes a processor 610 for executing the software 606 and using or updating the data 508 stored in memory 604. The software 606 may include an operating system and any other software applications a user may wish to install. In some examples, the computing system 600 may be associated with a user. In such case, the software 606 may be an application to render web content, such as a browser. The software 606 may include machine readable instructions of a computer program product that when executed, perform the functions described above.

The user interface 612 may include a number of input devices such as a mouse, touchpad, or touchscreen that allow the user to interact with the computing system 600. The user interface 612 may also include a number of different types of output devices such as a monitor or a touchscreen. The user interface allows the user to interact with the processing system 600 in a manner as described above.

The network interface 614 may include hardware and software that allows the processing system 600 to communicate with other processing systems over a network 616. The network interface 614 may be designed to communicate with the network 616 through hardwire media such as Ethernet, coaxial, fiber-optic, etc. The network interface 614 may also be designed to communicate with the network 616 using wireless technologies.

Some examples of processing systems described herein may include non-transitory, tangible, machine readable media that include executable code that when run by one or more processors may cause the one or more processors to perform the processes of methods as described above. Some common forms of machine-readable media that may include the processes of methods are, for example, floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method performed by a computing system, the method comprising:
    receiving from a first detection system, a plurality of identity tokens, the plurality of identity tokens including different types of identity tokens, the first detection system having a plurality of different types of detection instruments;
    using information from the first detection system, creating correlation information that correlates different types of identity tokens, the correlation information including correlation of a first identity token with a second identity token;
    receiving from a second detection system, a number of identity tokens, the second detection system having a plurality of different types of detection instruments that is fewer than the first detection system, the first detection system and the second detection system being positioned such that a branching point in a roadway is between the first detection system and the second detection system; and
    using either the first identity token or the second identity token, identifying a vehicle passing through the second detection system.

2. The method of claim 1, wherein the plurality of different types of detection instruments of the first detection systems includes at least two of: a Radio Frequency Identifier (RFID) reader, an imaging system, a Bluetooth network transponder, and a cellular network transponder.

3. The method of claim 2, wherein the second detection system includes at least one of: a Radio Frequency Identifier (RFID) reader, an imaging system, a Bluetooth network transponder, and a cellular network transponder.

4. The method of claim 1, wherein the different types of identity tokens include an RFID tag, a front license plate, a rear license plate, a Bluetooth Media Access Control (MAC) address, and a cellular network address.

5. The method of claim 1, wherein identifying a vehicle passing through the second detection system comprises detecting a single identity token with the second detection system and using the correlation information to associate the single identity token with other identity tokens obtained from the first detection system.

6. The method of claim 1, wherein the first detection system is geographically separated from the second detection system.

7. The method of claim 1, wherein the first detection system is positioned on a gantry on a highway.

8. The method of claim 1, wherein the second detection system is positioned in an urban setting.

9. The method of claim 1, wherein the second detection system uses a larger detection time window than the first detection system.

10. The method of claim 1, wherein the second detection system uses a larger detection volume than the first detection system.

11. A system comprising:
    a processor; and
    a memory having machine readable instructions that when executed by the processor cause the system to:
    receive from a first detection system, a plurality of identity tokens, the plurality of identity tokens including different types of identity tokens, the first detection system having a plurality of different types of detection instruments;
    using information from the first detection system, create correlation information that correlates different types of identity tokens;
    receive from a second detection system, a number of identity tokens, the second detection system having a plurality of different types of detection instruments that is fewer than the first detection system, and the first detection system and the second detection system having at least one common detection instrument, the first detection system and the second detection system being positioned such that a branching point in a roadway is between the first detection system and the second detection system; and
    using the number of identity tokens received from the first and second detection systems, identifying a vehicle passing through the second detection system.

12. The method of claim 11, wherein the plurality of different types of detection instruments of the first detection system includes an image capture instrument, a network interface system, and a Radio Frequency Identifier (RFID) reader.

13. The system of claim 12, wherein the plurality of different types of detection instruments of the second detection system includes an RFID instrument and an image sensor instrument.

14. The system of claim 12, wherein the plurality of different types of detection instruments of the second detection system includes an RFID instrument and a network interface instrument.

15. The system of claim 12, wherein the plurality of different types of detection instruments of the second detection system includes a network interface instrument and an image sensor instrument.

16. The system of claim 11, wherein the second detection system is placed at a geographic region that is more restrictive than a geographic region where the first detection system is placed.

17. The system of claim 11, wherein the first detection system is placed on a highway.

18. The system of claim 11, wherein the second detection system is placed on an urban street.

19. A system comprising:
a first detection system comprising:
   a first detection instrument of a first type;
   a second detection instrument of a second type; and
   a third detection instrument of a third type;
a second detection system comprising, a fourth detection instrument of the first type, the second detection system having fewer types of detection instruments than the first detection system, the first detection system and second detection system being positioned such that a branching point in a roadway is between the first detection system and the second detection system; and
a control system configured to:
   receive from the first detection system, a plurality of identity tokens, the plurality of identity tokens including different types of identity tokens;
   with information from the first detection system, create correlation information that correlates different types of identity tokens;
   receive from the second detection system, a number of identity tokens; and
   use the number of identity tokens received from the first and second detection systems to identify a vehicle passing through the second detection system.

20. The system of claim 19, wherein the second detection system is placed at a geographic region that is more restrictive than a geographic region where the first detection system is placed.

* * * * *